(12) United States Patent
Janson

(10) Patent No.: US 7,346,991 B1
(45) Date of Patent: Mar. 25, 2008

(54) HAND TOOL PROVIDING DOUBLE COMPOUND LEVERAGE TO THE JAWS

(76) Inventor: Paul M. Janson, 19151 Tulsa St., Northridge, CA (US) 91326

( * ) Notice: Subject to any disclaimer, the term of this patent is extended or adjusted under 35 U.S.C. 154(b) by 336 days.

(21) Appl. No.: 11/169,453

(22) Filed: Jun. 29, 2005

(51) Int. Cl.
*B26B 13/00* (2006.01)

(52) U.S. Cl. .......................... 30/244; 30/251; 30/252; 30/341

(58) Field of Classification Search .......... 30/186–188, 30/190, 191, 193, 244, 249, 250–252, 245, 30/341; D8/5, 52
See application file for complete search history.

(56) References Cited

U.S. PATENT DOCUMENTS

| | | | | |
|---|---|---|---|---|
| 374,480 A * | 12/1887 | Klein | .................... | 30/191 |
| 707,822 A * | 8/1902 | Casterlin | .................... | 30/193 |
| 736,671 A * | 8/1903 | Aksila | .................... | 30/252 |
| 756,056 A * | 3/1904 | Roraback | .................... | 30/186 |
| 832,804 A * | 10/1906 | Oneal et al. | .................... | 30/193 |
| 958,807 A * | 5/1910 | Hansen | .................... | 30/191 |
| 1,046,852 A * | 12/1912 | Prince | .................... | 30/252 |
| 1,254,284 A * | 1/1918 | Southwood | .................... | 30/252 |
| 1,572,787 A * | 2/1926 | Glee et al. | .................... | 30/252 |
| 2,356,672 A * | 8/1944 | Ivy | .................... | 30/252 |
| 2,539,294 A * | 1/1951 | Barnes | .................... | 30/252 |
| 2,577,638 A * | 12/1951 | Tibbetts | .................... | 30/193 |
| 2,587,586 A * | 3/1952 | Bernardi | .................... | 30/252 |
| 4,028,971 A * | 6/1977 | Budrose | .................... | 30/191 |
| 4,439,923 A * | 4/1984 | Scranton | .................... | 30/252 |
| 4,463,497 A * | 8/1984 | O'Keeffe | .................... | 30/252 |
| 5,003,695 A * | 4/1991 | Lipscomb et al. | ............ | 30/193 |
| D349,636 S * | 8/1994 | White et al. | .................... | D8/52 |
| 6,088,920 A * | 7/2000 | Schmick | .................... | 30/252 |
| 6,574,870 B1 * | 6/2003 | Huang | .................... | 30/252 |
| D519,013 S * | 4/2006 | Schmick | .................... | D8/52 |

* cited by examiner

*Primary Examiner*—Jason D. Prone
(74) *Attorney, Agent, or Firm*—Timothy Thut Tyson; Ted Masters; Freilich, Hornbaker & Rosen

(57) ABSTRACT

A hand tool for use by one hand provides double compound leverage of the force exerted on the handles to the jaws. This is achieved by adding additional pivots and lever arms between the handles and the jaws. The jaws may take the form of a sheet metal snip or a pruning shear.

5 Claims, 5 Drawing Sheets

HAND TOOL PROVIDING DOUBLE COMPOUND LEVERAGE TO THE JAWS

TECHNICAL FIELD

The present invention pertains generally to hand tools, and more particularly to hand tools that are operated using one hand.

BACKGROUND OF THE INVENTION

Hand tools having two pivotally connected handles for moving jaws that a user operates with one hand are well known in the art. The basic tool has three parts: a unitary first member having a first handle on one end and a first jaw on the other, a unitary second member having a second handle on one end and a second jaw on the other, and an axle pivotally connecting the two together. Scissors and sheet metal snips are examples of such hand tools operated by one hand.

In certain applications the mechanical advantage offered by the leverage of such a three part hand tool is insufficient making it difficult or impossible to achieve the desired result with one hand. For example, cutting a thick gauge of sheet metal with a simple sheet metal snip can require more hand pressure than the user can deliver, particularly when the cutting must be performed over a protracted period of time.

FIGS. 1 and 2 illustrate side elevation views of a prior art hand tool 500 shown in open and closed positions. The hand tool shown is generally referred to as an aviation snip. A second set of levers between the handles and the jaws compounds the force created by a person squeezing the handles when the force is transmitted to the jaws. This allows the user to cut thicker materials that would otherwise be difficult or impossible to cut with the strength of one hand. Hand tool 500 has a first jaw member 502 having a first end 504, an opposite second end 506, and an intermediate portion 508. Hand tool 500 also has a second jaw member 510 having a first end 512, an opposite second end 514, and an intermediate portion 516. Intermediate portion 516 of second jaw member 510 is pivotally connected to intermediate portion 508 of first jaw member 502 at a first pivot P1. Hand tool 500 also has a first handle member 518 having a first end 520, an opposite second end 522, and an intermediate portion 524. Intermediate portion 524 of first handle member 518 is pivotally connected to second end 514 of second jaw member 510 at a second pivot P2. Hand tool 500 also has a second handle member 526 having a first end 528, an opposite second end 530, and an intermediate portion 532. Intermediate portion 532 of second handle member 526 is pivotally connected to second end 506 of first jaw member 502 at a third pivot P3. First end 520 of first handle member 518 is pivotally connected to first end 528 of second handle member 526 at a seventh pivot P7. It is noted that pivot P7 is disposed between pivot P1 and pivots P2 and P3. Or put another way, when viewed as shown with pivot P1 the uppermost pivot, pivot P7 is below pivot P1 and above pivots P2 and P3. Hand tool 500 also includes a torsion spring 534 which biases first handle member 518 and second handle member 526 apart so that hand tool 500 resides in the open position of FIG. 1. A pivoting lock 536 cooperates with a shaft located at P2 to lock hand tool 500 in the closed position. The first jaw member 502 and second jaw member 510 are shaped and dimensioned so that they combine to form an aviation snip. They cross over each other as the hand tool is closed providing a cutting action such as in scissors. It is further noted that hand tool 500 is designed to be operated using only one hand.

While a simple metal shear may be satisfactory for certain applications where the material to be cut is relatively thin, and while a compound metal shear of the type shown as hand tool 500 above may be satisfactory for other applications where the material to be cut is somewhat thicker, it would be advantageous to have available yet another metal shear having even greater mechanical advantage for cutting material with one hand that could not be cut with either a simple or compound shear such as those shown in the prior art. Furthermore, such a metal shear having a greater mechanical advantage could also be used over a longer period of time by one hand to cut materials that could be cut by either of the other prior art devices for the short term.

BRIEF SUMMARY OF THE INVENTION

The present invention is directed to a hand tool that has an increased mechanical advantage. The hand tool of the present invention includes additional pivots and lever arms that increase the mechanical advantage of the hand tool. This is accomplished by adding center members between the jaw members and handle members of prior art hand tools.

In accordance with a preferred embodiment of the invention, a hand tool includes first and second jaw members which are pivotally connected at their intermediate portions. First and second center members are pivotally connected at their intermediate portions to the ends of the first and second jaw members, and the ends of the first and second center members are pivotally connected. First and second handle members are pivotally connected at their intermediate portions to the opposite ends of the first and second center members, and the ends of the first and second handle portions are pivotally connected. In all, the hand tool of the present invention includes six members that are connected at seven pivot points.

The jaws of the present invention can be adapted to perform a variety of tasks such as cutting sheet metal, cutting vegetation, and other uses.

Other aspects of the present invention will become apparent from the following detailed description, taken in conjunction with the accompanying drawings, which illustrate, by way of example, the principles of the invention.

DETAILED DESCRIPTION OF THE INVENTION

Figure 3:
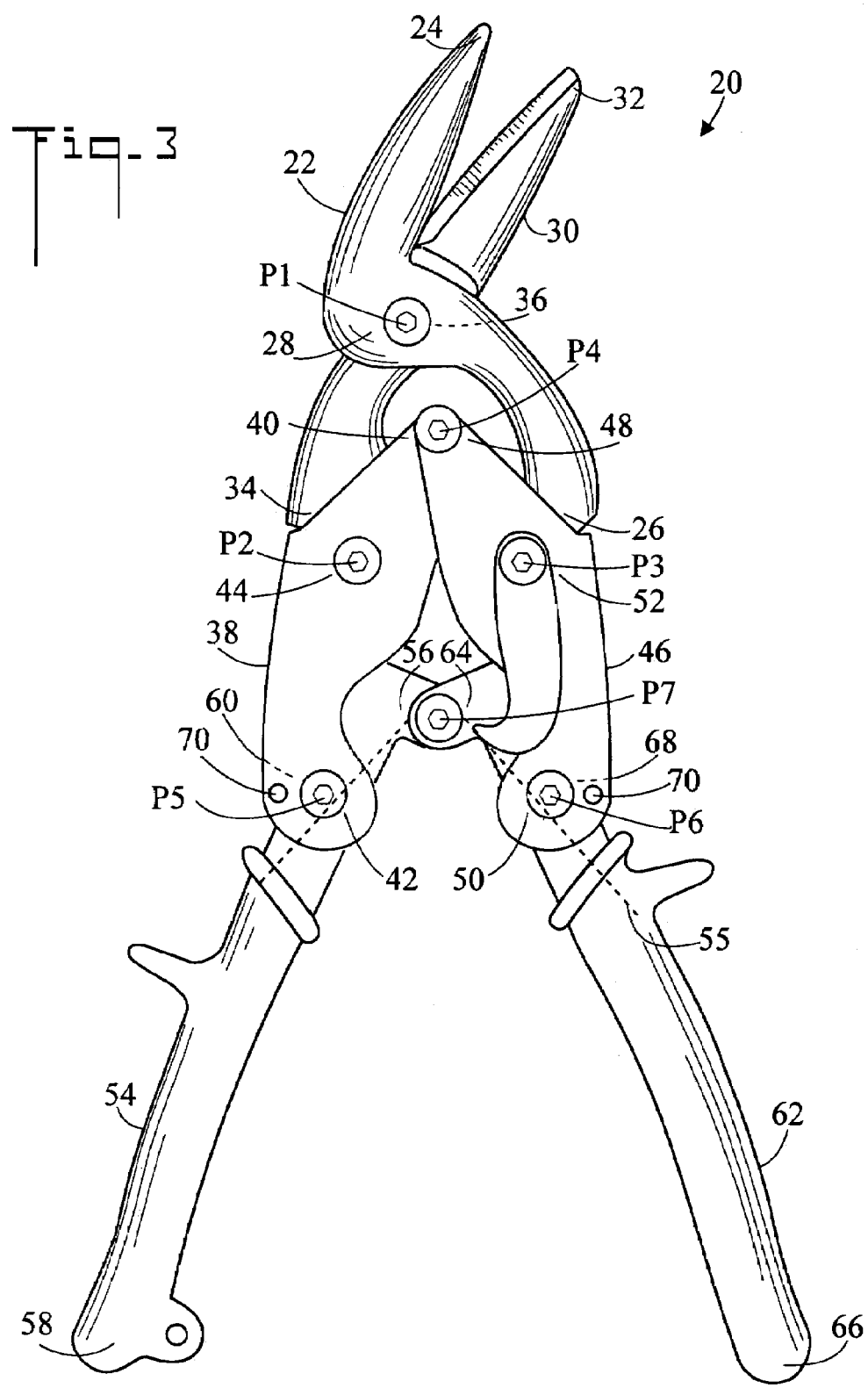
FIG. 3 is a side elevation view of a hand tool in accordance with the present invention shown in the open position.
Figure 4:
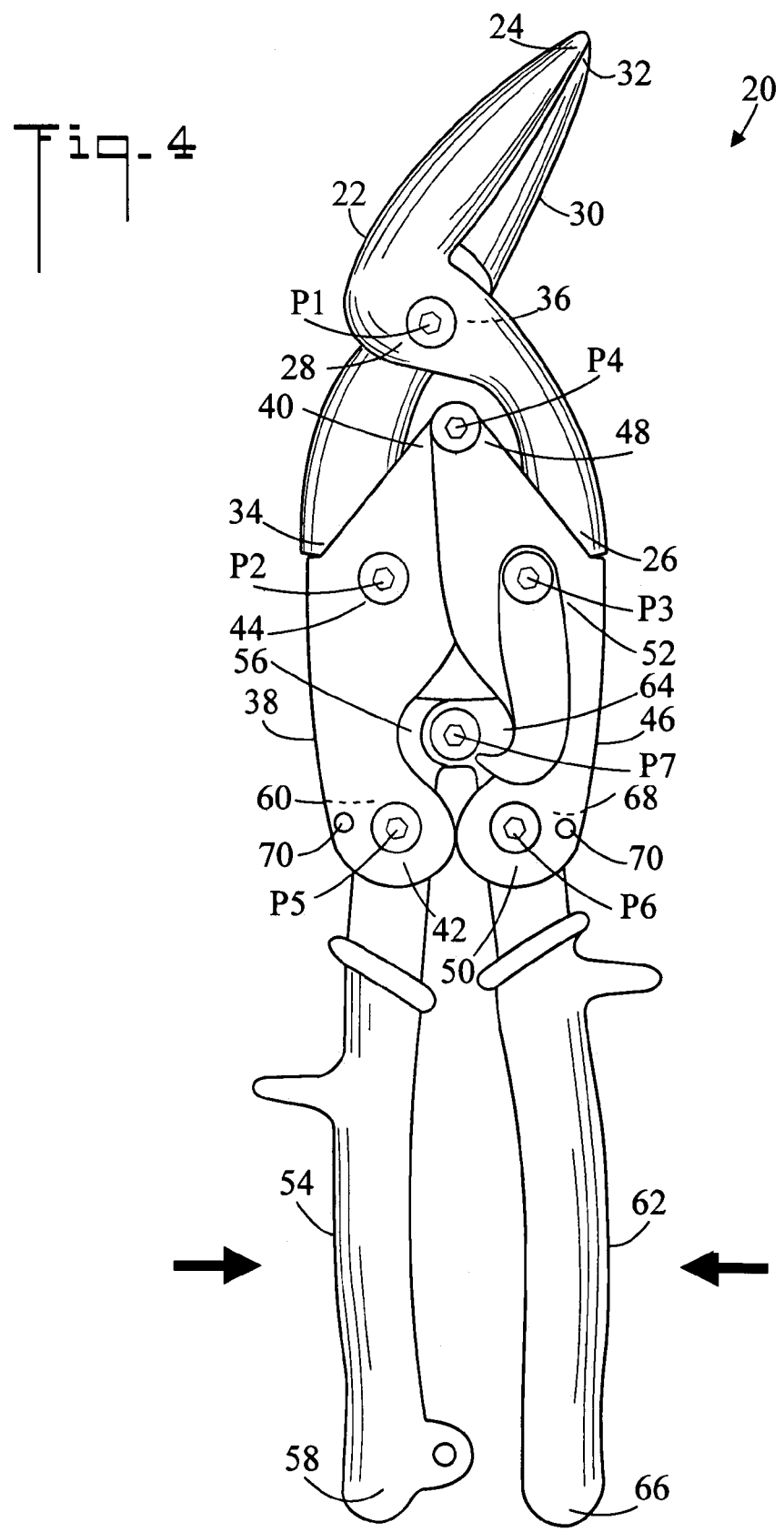
FIG. 4 is a side elevation view of the hand tool of the present invention shown in the closed position.

FIGS. 3 and 4 illustrate side elevation views of a hand tool 20 in accordance with the present invention shown in the open and closed positions, respectively. Hand tool 20 includes a first jaw member 22 having a first end 24, an opposite second end 26, and an intermediate portion 28. Hand tool 20 also has a second jaw member 30 having a first end 32, an opposite second end 34, and an intermediate portion 36. Intermediate portion 36 of second jaw member 30 is pivotally connected to intermediate portion 28 of first jaw member 22 at a first pivot P1.

Hand tool 20 also has a first center member 38 having a first end 40, an opposite second end 42, and an intermediate portion 44. Intermediate portion 44 of first center member 38 is pivotally connected to second end 34 of second jaw 30 member at a second pivot P2. Hand tool 20 also has a second center member 46 having a first end 48, an opposite second end 50, and an intermediate portion 52. Intermediate portion 52 of second center member 46 is pivotally connected to second end 26 of first jaw member 22 at a third pivot P3. First end 40 of first center member 38 is pivotally connected to first end 48 of second center member 46 at a fourth pivot P4. Fourth pivot P4 is disposed between first pivot P1 and second and third pivots P2 and P3. That is, in the shown view, pivot P4 is below pivot P1 and above pivots P2 and P3.

Hand tool 20 also has a first handle member 54 having a first end 56, an opposite second end 58, and an intermediate portion 60. Intermediate portion 60 of first handle member 54 is pivotally connected to second end 42 of first center member 38 at a fifth pivot P5. Hand tool 20 also has a second handle member 62 having a first end 64, an opposite second end 66, and an intermediate portion 68. Intermediate portion 68 of second handle member 62 is pivotally connected to second end 50 of second center member 46 at a sixth pivot P6. First end 56 of first handle member 54 is pivotally connected to first end 64 of second handle member 62 at a seventh pivot P7. Seventh pivot P7 is disposed between (1) second and third pivots P2 and P3, and (2) fifth and sixth pivots P5 and P6. Stop pins 70 limit the open distance first and second handle member 54 and 62 can move from each other. Hand tool 20 also includes a torsion spring 55 which biases first handle member 54 and second handle member 62 apart so that hand tool 20 resides in the open position of FIG. 3.

Figure 5:
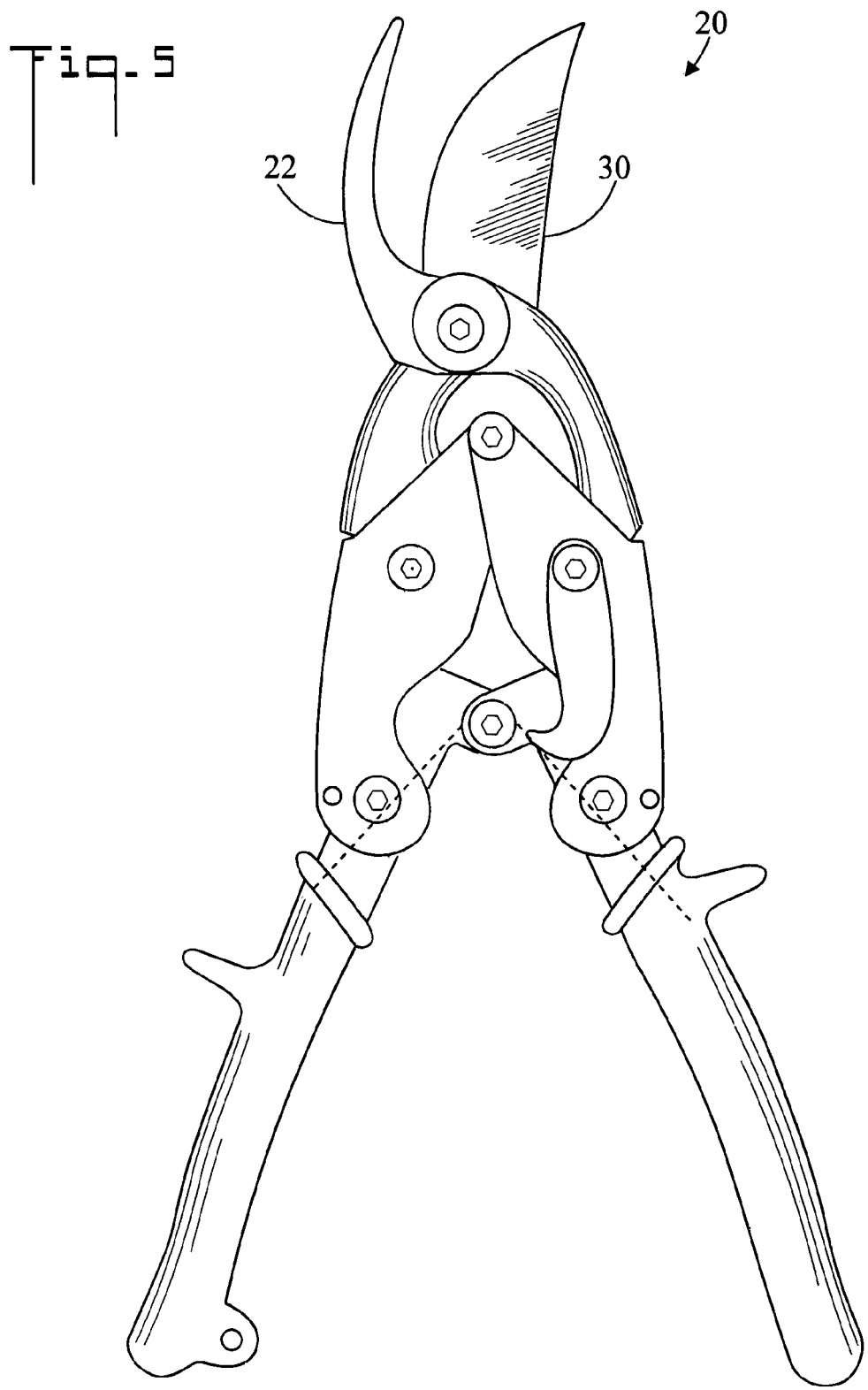
FIG. 5 is a side elevation view of a second embodiment of the present invention.

In the shown embodiment, first jaw member 22 and second jaw member 30 are shaped and dimensioned so that they combine to form the particular form of a sheet metal snip known as an aviation snip. However, it may be appreciated that hand tools 20 having the same structural arrangement of pivots and levers may be used for other purposes. One such hand tool 20 is depicted in FIG. 5 and the discussion pertaining thereto. As with prior art hand tool 500, hand tool 20 is designed to be operated using only one hand.

Figure 1:
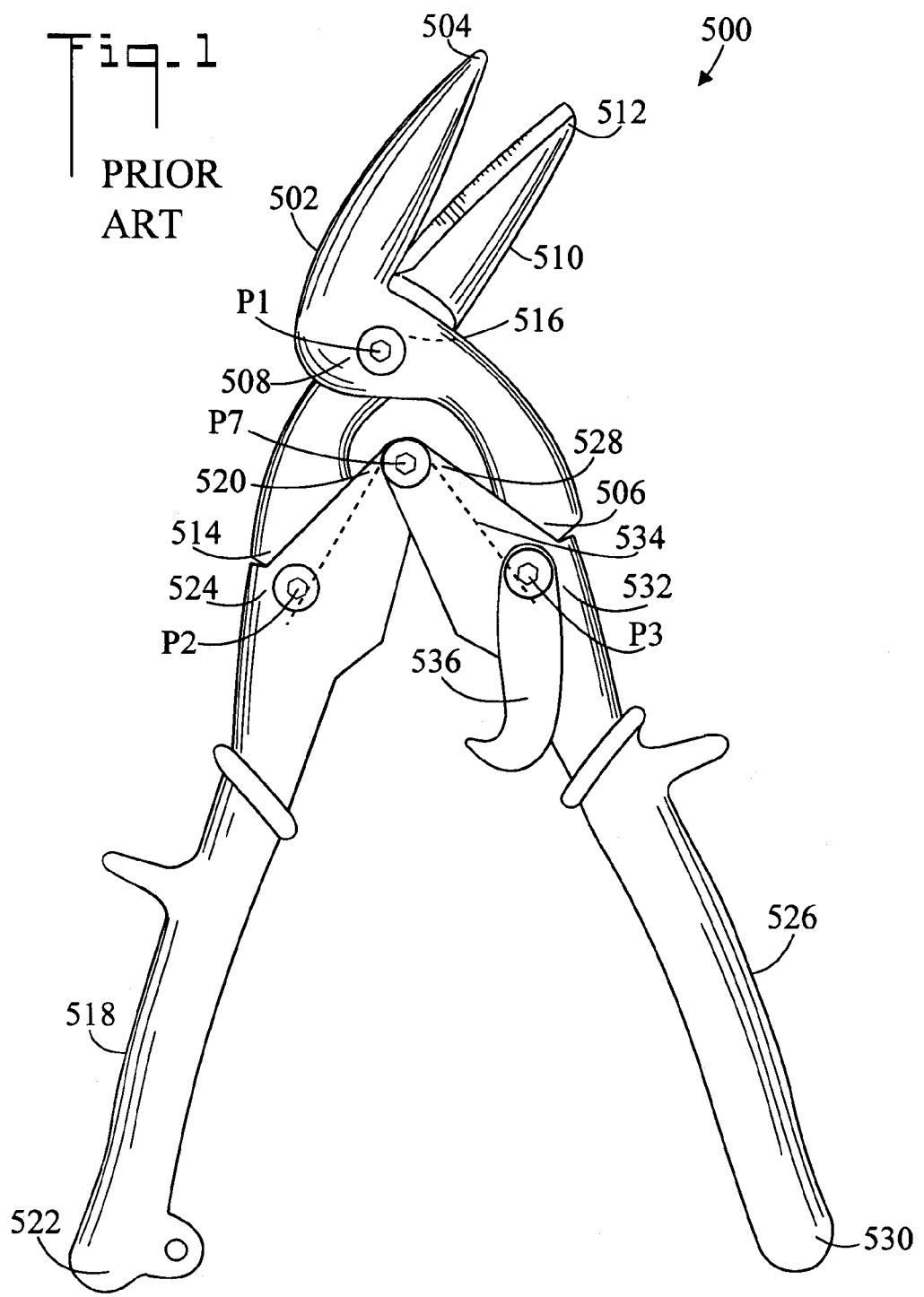
FIG. 1 is a side elevation view of a prior art hand tool shown in the open position.
Figure 2:
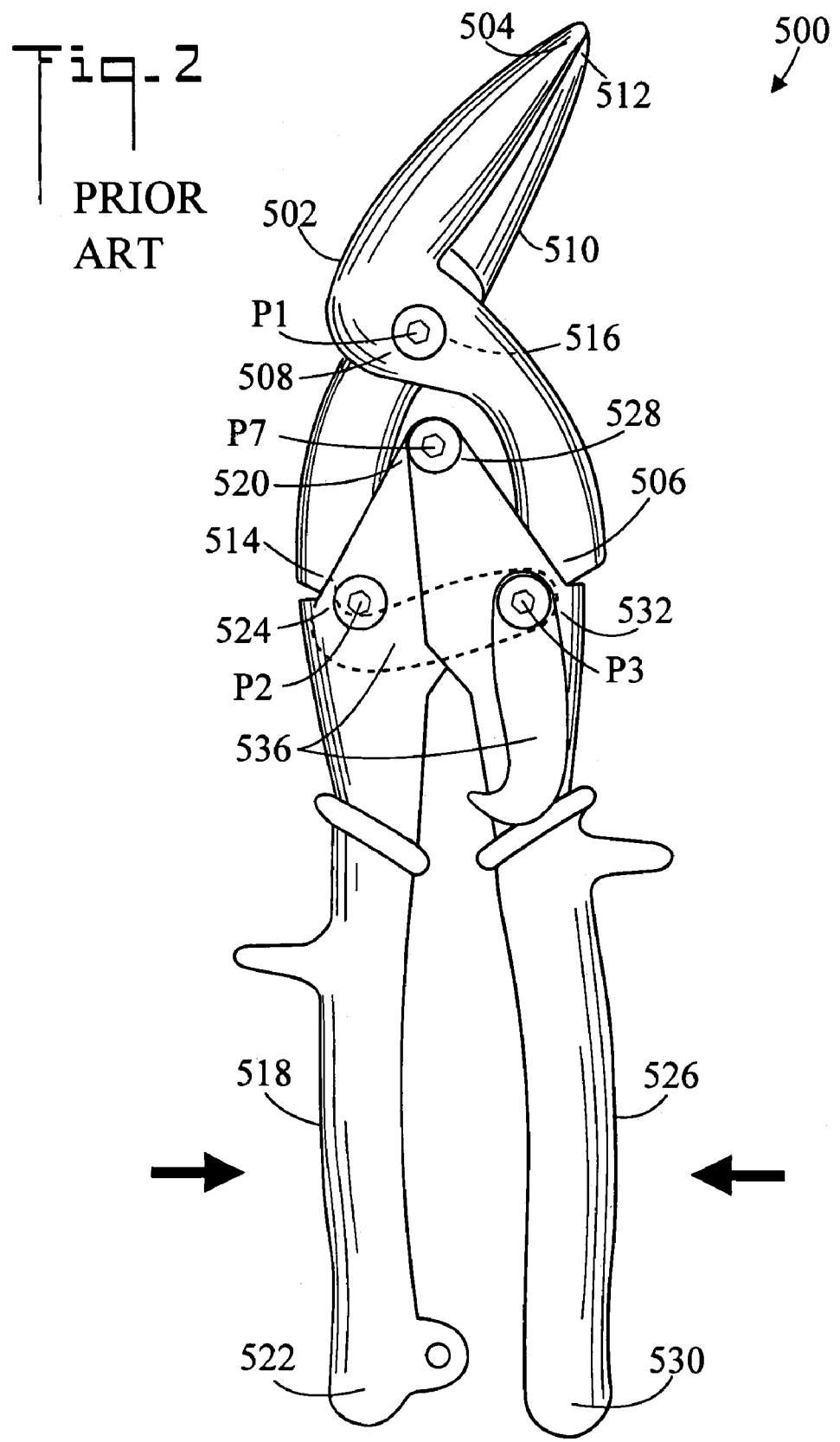
FIG. 2 is a side elevation view of the prior art hand tool shown in the closed position.

It is noted that the addition of first and second center members 38 and 46 only adds slightly to the overall length of hand tool 20 when compared to the prior art hand tool 500 of FIGS. 1-2. But the mechanical advantage MA of hand tool 20 is significantly increased over that of prior art hand tool 500. The mechanic advantage MA of hand tool 20 is more than twice as great as the mechanical advantage MA of prior art hand tool 500.

FIG. 5 is a side elevation view of a second embodiment of the present invention. In this embodiment, first jaw member 22 and second jaw member 30 are shaped and dimensioned so that they combine to form a pruning shear. It may be appreciated that other embodiments of first jaw member 22 and second jaw member 30 are also possible to perform other types of work.

The preferred embodiments of the invention described herein are exemplary and numerous modifications, variations, dimensional variations, and rearrangements can be readily envisioned to achieve an equivalent result, all of which are intended to be embraced within the scope of the appended claims.

I claim:

1. A cutting tool, comprising:
    a first jaw member having a first end, an opposite second end, and an intermediate portion;
    a second jaw member having a first end, an opposite second end, and an intermediate portion, said intermediate portion of said second jaw member pivotally connected to said intermediate portion of said first jaw member at a first pivot P1;
    a first center member having a first end, an opposite second end, and an intermediate portion, said intermediate portion of said first center member pivotally connected to said second end of said second jaw member at a second pivot P2;
    a second center member having a first end, an opposite second end, and an intermediate portion, said intermediate portion of said second center member pivotally connected to said second end of said first jaw member at a third pivot P3;
    said first end of said first center member pivotally connected to said first end of said second center member at a fourth pivot P4, wherein said fourth pivot P4 is disposed between (1) said first pivot P1, and (2) said second and third pivots P2 and P3;
    a first handle member having a first end, an opposite second end, and an intermediate portion, said intermediate portion of said first handle member pivotally connected to said second end of said first center member at a fifth pivot P5;
    a second handle member having a first end, an opposite second end, and an intermediate portion, said intermediate portion of said second handle member pivotally connected to said second end of said second center member at a sixth pivot P6; and,
    said first end of said first handle member pivotally connected to said first end of said second handle member at a seventh pivot P7, wherein said seventh pivot P7 is disposed between (1) said second and third pivots P2 and P3, and (2) said fifth and sixth pivots P5 and P6.

2. The cutting tool of claim 1, further including said first jaw member and said second jaw member combining to form a sheet metal snip.

3. The cutting tool of claim 1, further including said first jaw member and said second jaw member combining to form a pruning shear.

4. In a cutting tool having (a) a first jaw member having a first end, an opposite second end, and an intermediate portion, (b) a second jaw member having a first end, an opposite second end, and an intermediate portion, the intermediate portion of the second jaw member pivotally connected to the intermediate portion of the first jaw member at a first pivot P1, (c) a first handle member having a first end, an opposite second end, and an intermediate portion, (d) a second handle member having a first end, an opposite second end, and an intermediate portion, the first end of the first handle member pivotally connected to the first end of the second handle member at a seventh pivot P7, the improvement comprising:
    a first center member having a first end, an opposite second end, and an intermediate portion, said intermediate portion of said first center member pivotally connected to the second end of the second jaw member at a second pivot P2;

a second center member having a first end, an opposite second end, and an intermediate portion, said intermediate portion of said second center member pivotally connected to the second end of the first jaw member at a third pivot P3;

said first end of said first center member pivotally connected to said first end of said second center member at a fourth pivot P4, wherein said fourth pivot P4 is disposed between (1) the first pivot P1, and (2) said second and third pivots P2 and P3;

said second end of said first center member pivotally connected to the intermediate portion of the first handle member at a fifth pivot P5; and, said second end of said second center member pivotally connected to the intermediate portion of the second handle member at a sixth pivot P6, wherein the seventh pivot P7 is disposed between (1) said second and third pivots P2 and P3, and (2) said fifth and sixth pivots P5 and P6.

5. The improved cutting tool of claim 4, further including said improved cutting tool being a sheet metal snip.

* * * * *